(12) United States Patent  
Brueegen

(10) Patent No.: US 7,472,662 B2
(45) Date of Patent: Jan. 6, 2009

(54) VACUUM PUMP FOR AGRICULTURAL SEEDING EQUIPMENT

(75) Inventor: Shane Brueegen, Cordova, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/605,188

(22) Filed: Nov. 28, 2006

(65) Prior Publication Data

US 2008/0006190 A1 Jan. 10, 2008

Related U.S. Application Data

(62) Division of application No. 10/769,475, filed on Jan. 31, 2004, now Pat. No. 7,140,311.

(51) Int. Cl.
*G01F 11/20* (2006.01)

(52) U.S. Cl. ........................ 111/200; 222/410
(58) Field of Classification Search ......... 111/183–185, 111/177, 200; 222/410
See application file for complete search history.

(56) References Cited

U.S. PATENT DOCUMENTS

| 2,874,878 A | 2/1959 | Stokland |
| 4,890,547 A | 1/1990 | Wagner et al. |
| 5,170,909 A | 12/1992 | Lundie et al. |
| 6,308,646 B1 | 10/2001 | Luxon |
| 6,644,225 B2 | 11/2003 | Keaton |
| 6,689,315 B2 | 2/2004 | Linker et al. |
| 7,140,311 B2 | 11/2006 | Brueggen |

OTHER PUBLICATIONS

Admitted Prior Art Diagrams of Deere Fan, 4 sheets.

*Primary Examiner*—Christopher J. Novosad
(74) *Attorney, Agent, or Firm*—The Law Office of Randall T. Erickson, P.C.

(57) ABSTRACT

A vacuum pump for a seed planter includes a housing, an impeller rotated within the housing, and a motor or other drive. The housing has a central inlet and a circumferentially arranged outlet passage. The impeller vanes define air paths that are open to the outlet passage. The impeller has a central aperture for coupling to the output shaft of the drive and an impeller center cap screwed into the central aperture. The impeller has a curved conical center hub that surrounds the central aperture. The center hub and the center cap are configured to smoothly direct air flow to the passages between the vanes to reduce or eliminate a stagnant air region in a center of the impeller. The center cap can also be used as a tool to remove the impeller from the output shaft.

20 Claims, 11 Drawing Sheets

VACUUM PUMP FOR AGRICULTURAL SEEDING EQUIPMENT

This application is a divisional application of U.S. Ser. No. 10/769,475, filed Jan. 31, 2004 and now U.S. Pat. No. 7,140,311.

TECHNICAL FIELD OF THE INVENTION

The invention relates to vacuum pumps, and particularly vacuum pumps used in agricultural seed planters utilizing vacuum controlled seed meters.

BACKGROUND OF THE INVENTION

In a typical agricultural seed planter, a plurality of seed meters are arranged in a row corresponding to furrows to be seeded. Such a seed planter is disclosed in U.S. Pat. Nos. 6,308,646 or 6,644,225. Each seed meter is supplied with a supply of seeds. A seed meter disk is rotated within the seed meter in communication with the supply of seeds while a vacuum is applied to an opposite side of the disk. The seed meter discharges seed at a predetermined rate along the furrow. Such a seed meter is disclosed for example in U.S. Pat. No. 5,170,909.

To supply the vacuum to each seed meter, a vacuum pump is arranged on the seed planter. Typically, the vacuum pump used on agricultural seed planters is an off-the-shelf centrifugal fan or blower implemented in such a manner to generate the needed vacuum. These pumps can be large and cumbersome.

The current vacuum pump design for a JOHN DEERE 1700 series planter uses a typical centrifugal fan design with a scroll housing. In such a design, the outlet of the impeller is channeled into a single channel by the impeller housing. The vacuum pump is driven by a hydraulic motor. The current vacuum pump assembly for a JOHN DEERE 1700 series seed planter must be rotated at over 8000 rpm to achieve the necessary pressure drop for the vacuum seed meters to plant the larger corner-condition crops. This rpm requirement can necessitate a costly hydraulic motor for the vacuum pump.

Furthermore, the current JOHN DEERE 1700 series seed planter centrifugal blowers require a special tool to remove the impeller from the hydraulic motor output shaft.

The present inventor has recognized that a need exists for an improved seed meter vacuum pump that can generate sufficient pressure drop or vacuum to dispense larger "corner-condition" crops using vacuum controlled seed meters, at an rpm within a usable range for a cost effective hydraulic motor. The present inventor has recognized that a need exists for a seed meter vacuum pump that can generate an increased pressure drop compared to current centrifugal air blowers used on seed planters, while retaining a compact size.

The present inventor has recognized that a need exists for a seed meter vacuum pump that is easily maintained, including being easily assembled and disassembled.

SUMMARY OF THE INVENTION

The invention provides a vacuum pump that includes a housing, and an impeller. The housing has a housing base and a housing cover that defines a volume therebetween. The housing cover has a central inlet. The housing also has an outlet. The impeller is arranged within the housing. The impeller has a central opening in fluid communication with the central inlet. The housing base has a shaft opening arranged for receiving a rotational output shaft with a threaded end portion. When a output shaft is received, the threaded end penetrates the shaft opening.

The impeller has a central aperture for receiving the output shaft, a shoulder within the central aperture, and a cap. The cap has a head portion and a threaded shank portion that is screwed into a threaded region of the central aperture.

The impeller is securable to the output shaft by a nut that is tightenable on the threaded end portion of the output shaft. The nut bears against the shoulder when tightened on the threaded end portion of the output shaft.

The threaded shank portion of the cap is threaded into the threaded region of the central aperture to a first threaded depth. When the nut is removed, the threaded shank portion of the cap can be threaded into the threaded region of the central aperture to a second threaded depth—deeper than the first threaded depth—for displacing the output shaft axially with respect to the impeller. Preferably the shank portion bears against an end of the output shaft when the shank portion is at the first threaded depth.

Preferably, the head portion of the cap extends into a central region of the impeller. The impeller has vanes extending out from a periphery of the central region, and the head portion extends into the central region of the impeller substantially between diametrically opposed base ends of two vanes. In one embodiment the vanes are curved.

In another embodiment, the impeller has an impeller base and an impeller shroud, spaced apart by a plurality of vanes. The shroud has a central opening that serves as the central inlet of the impeller. The impeller base includes a curved, substantially conical, central hub in substantial registry with the central opening. The central aperture is formed in the central hub.

Preferably the head portion of the cap protrudes from the central hub. The central hub is located within a central region of the impeller spaced from base ends of the vanes. The center hub has a curved, substantially conical taper or shape that acts to smoothly direct the incoming air approximately 90° to enter the air passages between vanes. The center hub and center cap design of the impeller are configured to reduce or to eliminate a stagnant air spot in the center of the impeller by imparting a movement to the incoming air, causing a smooth flow transition to the base ends of the vanes.

In another embodiment, the vanes have a height between the base and the shroud that is decreasing in a radial direction such that a circumferential flow area through the impeller remains substantially constant along a radial direction.

The design of the impeller allows air to be discharged from the impeller in a 360 degree pattern and avoids channeling the air into a single air stream. This allows the impeller size to be increased without significantly increasing the overall size of the pump.

In operation, the impeller assembly is rotated by the shaft, within the space defined by the housing. Air is drawn into seed meters, through hoses and through the inlet nozzles and into the impeller assembly. The air is pumped by rotation of the impeller assembly radially outward by the vanes and out of the housing through the outlet passage formed between the housing cover and the housing base. Dust, small seeds, and debris passing through the openings are directed downward by a debris shield.

As another aspect of the invention, the removal of the impeller from the motor output shaft for maintenance or replacement is simplified. The cap is unscrewed and removed, and the nut is unscrewed and removed. The impeller at this point is effectively press fit onto the drive output shaft and manual removal is difficult. According to this aspect the invention, the cap can be screwed back into the opening, until the end of the shank portion abuts the end of the shaft. Further tightening of the cap drives the impeller off the shaft in the axial direction. In other words, the force generated by the center cap being reinstalled into the threaded region of the central aperture slides the impeller assembly off the taper on the shaft.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
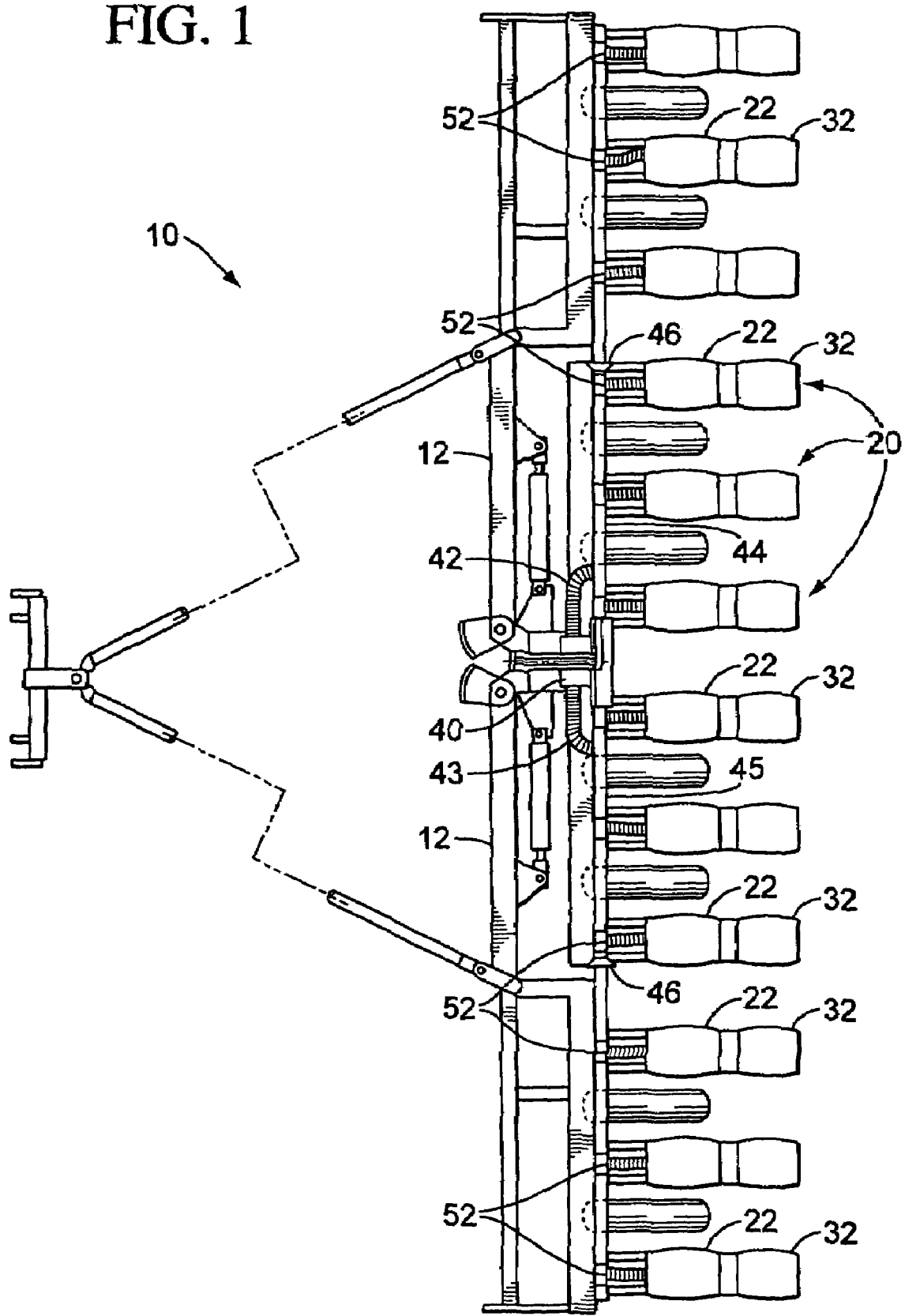
FIG. 1 is a top view of a row crops planter having a plurality of individual planting units.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 is a top view of a seeding machine 10. In the illustrated embodiment, the seeding machine is a row crop planter; however, the present invention could be used on other seeding machines having pneumatic seed meters, including grain drills and air seeders. The planter can be configured as described in U.S. Pat. Nos. 6,308,646 or 6,644,225, herein incorporated by reference. The planter comprises a frame 12 that can be extended into a working configuration illustrated in FIG. 1 and folded into a transport configuration. A plurality of row crop planting units 20 is mounted to the frame 12.

An air vacuum pump 40 in the form of a fan creates a negative air pressure in two air tubes 42 and 43. The air tube 42 extends between the air pump 40 and the pneumatic manifold 44. The air tube 43 extends between the pump 40 and the pneumatic manifold 45. Each of the pneumatic manifolds 44 and 45 comprises a cylindrical tube that extends along the frame 12. Each of the pneumatic manifolds 44 and 45 comprises two sections that are coupled together by a flapper coupling 46. The flapper coupling 46 allows each of the manifolds to be split apart as the planter frame 12 is being folded and to be rejoined when the planter frame is unfolded into its working configuration.

Figure 2:
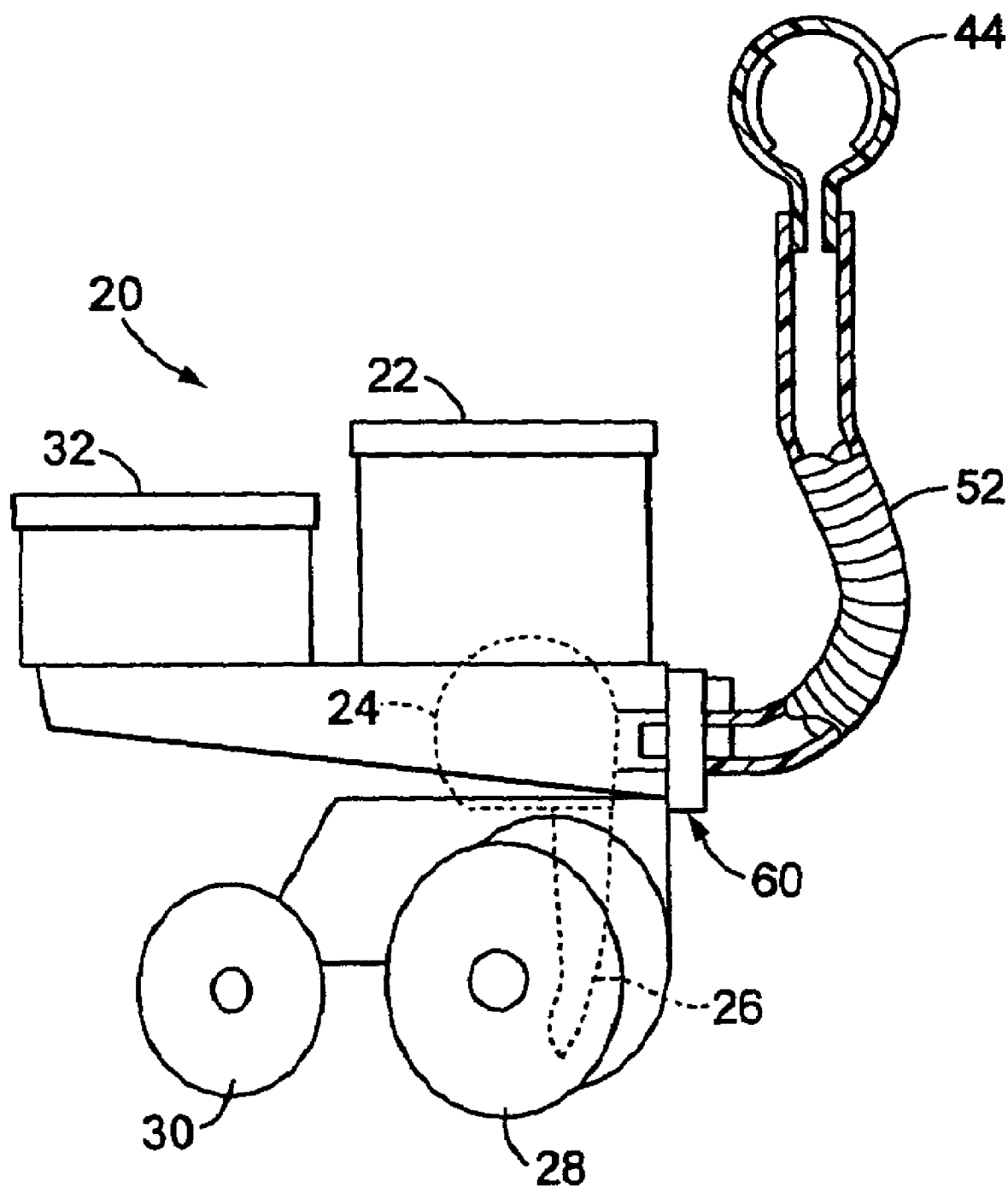
FIG. 2 is a semi-schematic side view of one planting unit and the pneumatic distribution system associated therewith.

FIG. 2 illustrates each of the row crop planting units 20 is provided with a seed hopper 22 that directs seed to a seed meter 24 which meters the seed. The metered seed is directed by a seed tube 26 from the seed meter 24 to a planting furrow formed in the ground by furrow opener 28. A planting furrow is closed by angled closing wheels 30. The planting unit may also be provided with a pesticide hopper 32 for carrying pesticides to be applied during the planting process.

The seed meter 24, in the illustrated embodiment, is a vacuum meter of the type presently marketed by the assignee of the present application. A vacuum seed meter is disclosed for example in U.S. Pat. No. 5,170,909 herein incorporated by reference. Negative air pressure is used to attract seeds to a seeding disc as it passes through a seed pile or puddle. The seeds remain in contact with the disc until the vacuum is removed and the seeds fall into the seed tube 26.

The seed meter 24 is connected to vacuum by a hose 52 that is connected to the manifold 44. A balancing orifice or valve 60 can be provided at each seed meter 24 or at selected seed meters.

Figure 3:
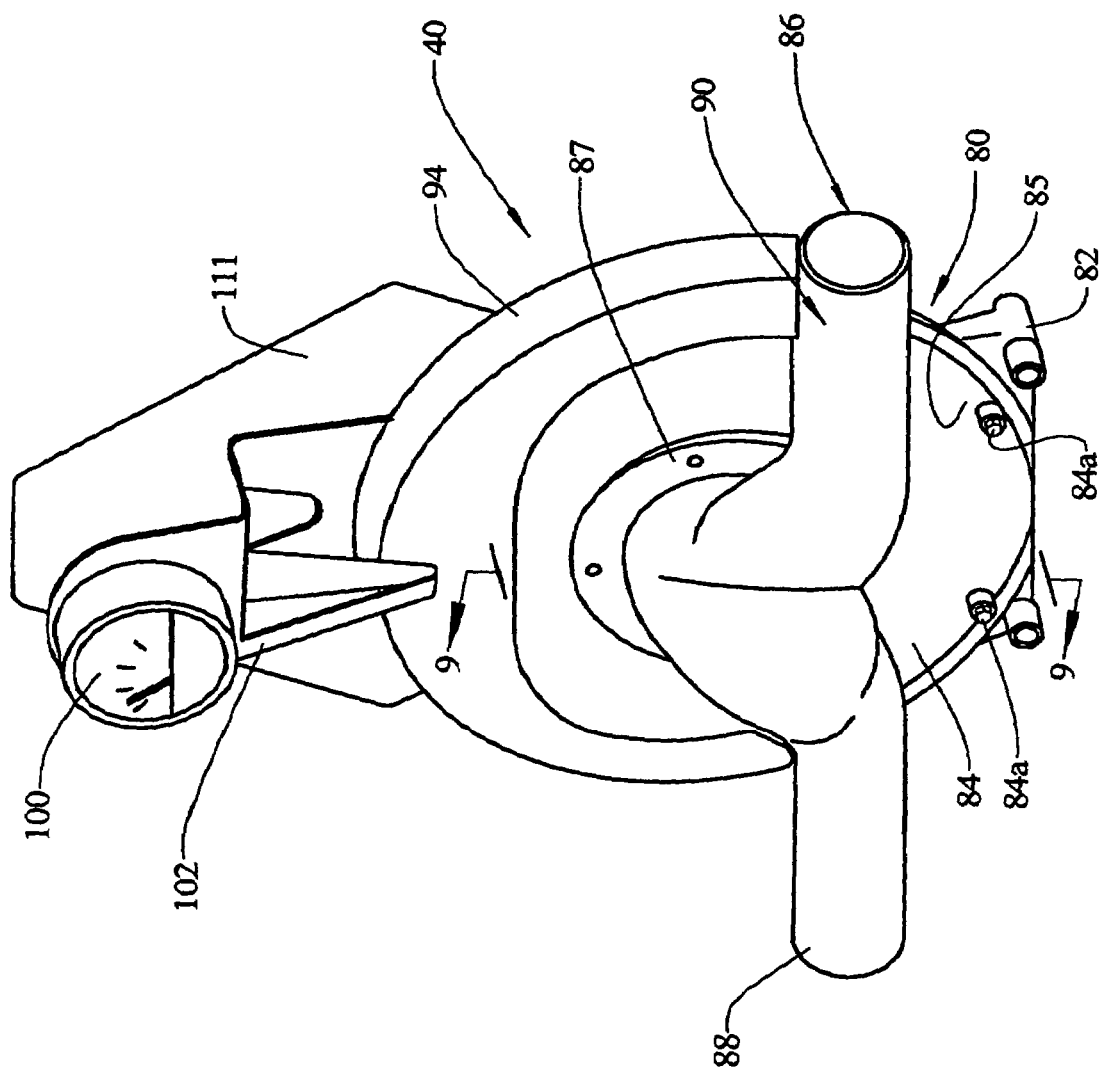
FIG. 3 is a front perspective view of a vacuum pump of the present invention.
Figure 5:
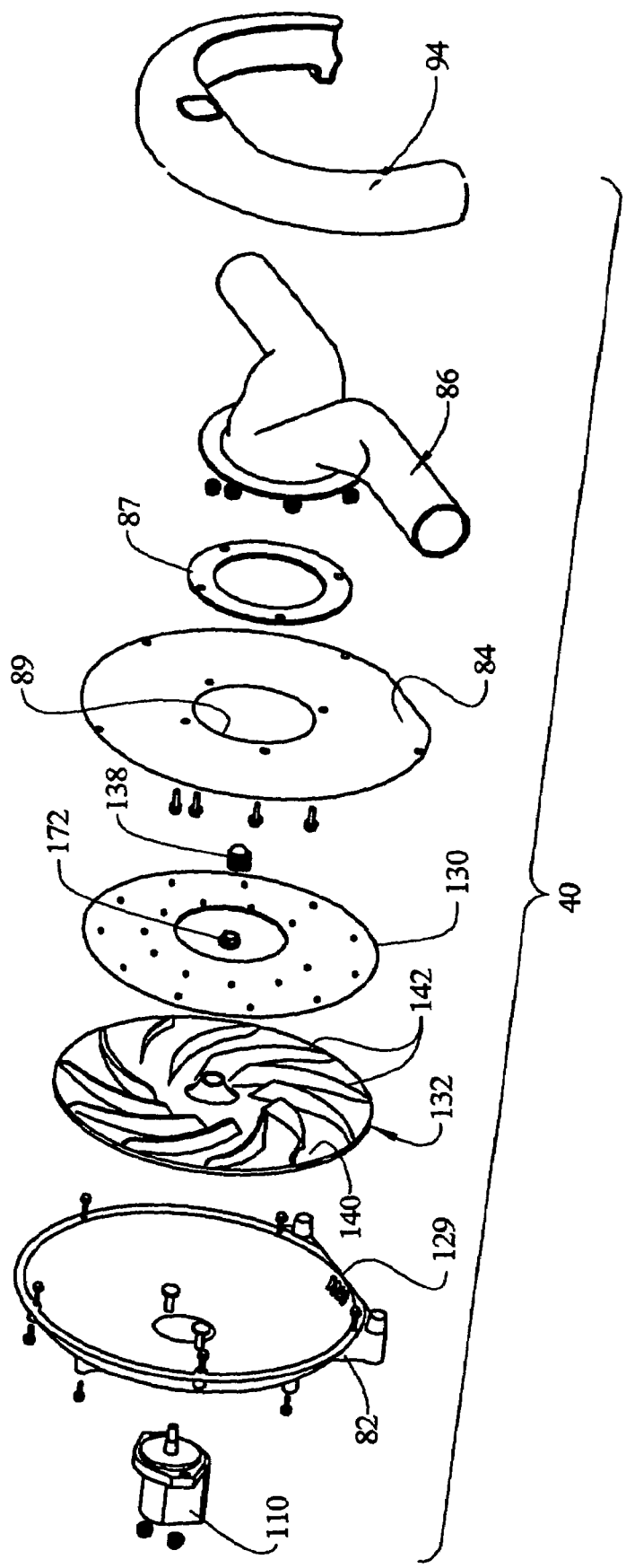
FIG. 5 is an exploded, perspective view of the vacuum pump of FIG. 3.
Figure 9:
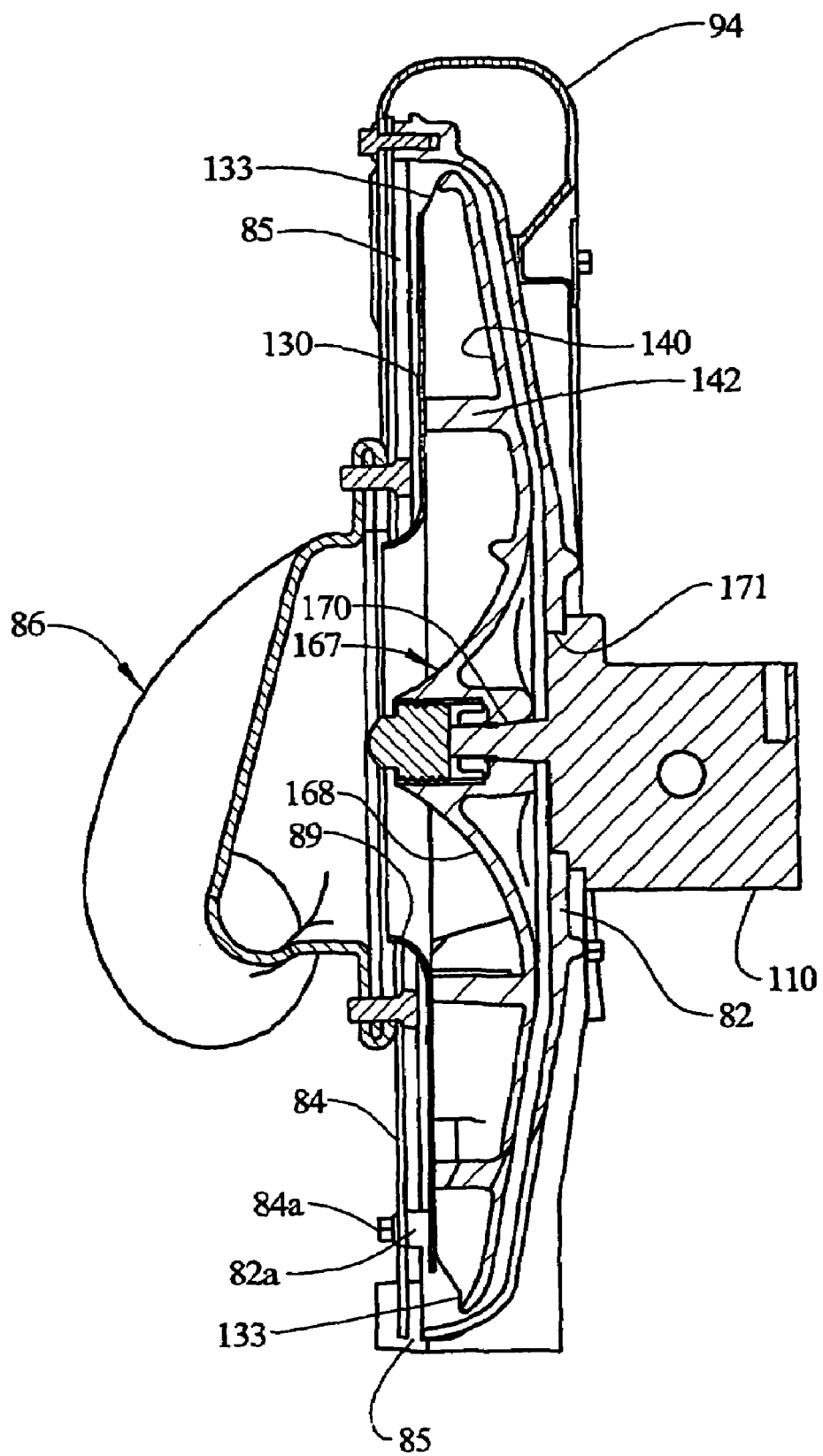
FIG. 9 is a sectional view taken generally along line 9-9 of FIG. 3.

FIG. 3 illustrates the vacuum pump 40 of the present invention. The vacuum pump 40 includes a housing 80 defined by a housing base 82 and a housing cover 84 fastened by fasteners 84a to bosses 82a of the housing base 82. The bosses 82a hold the cover 84 away from the base 82 a select amount, forming a substantially 360 degree annular air passage 85 between the cover 84 and the base 82 as shown in FIG. 9. An inlet manifold 86 is bolted to the cover 84 with an intervening foam baffle or gasket 87, over a central opening 89 (FIGS. 5 and 9). The inlet manifold 86 includes an inlet nozzle 88 that connects to the hose 42 shown in FIG. 1, and an inlet nozzle 90 that connects to the hose 43 shown in FIG. 1. Fastened to the cover and housing is a debris shield 94, the function of which will be described below. A vacuum gauge 100 is supported by a bracket 102, fastened to the shield 94.

Figure 4:
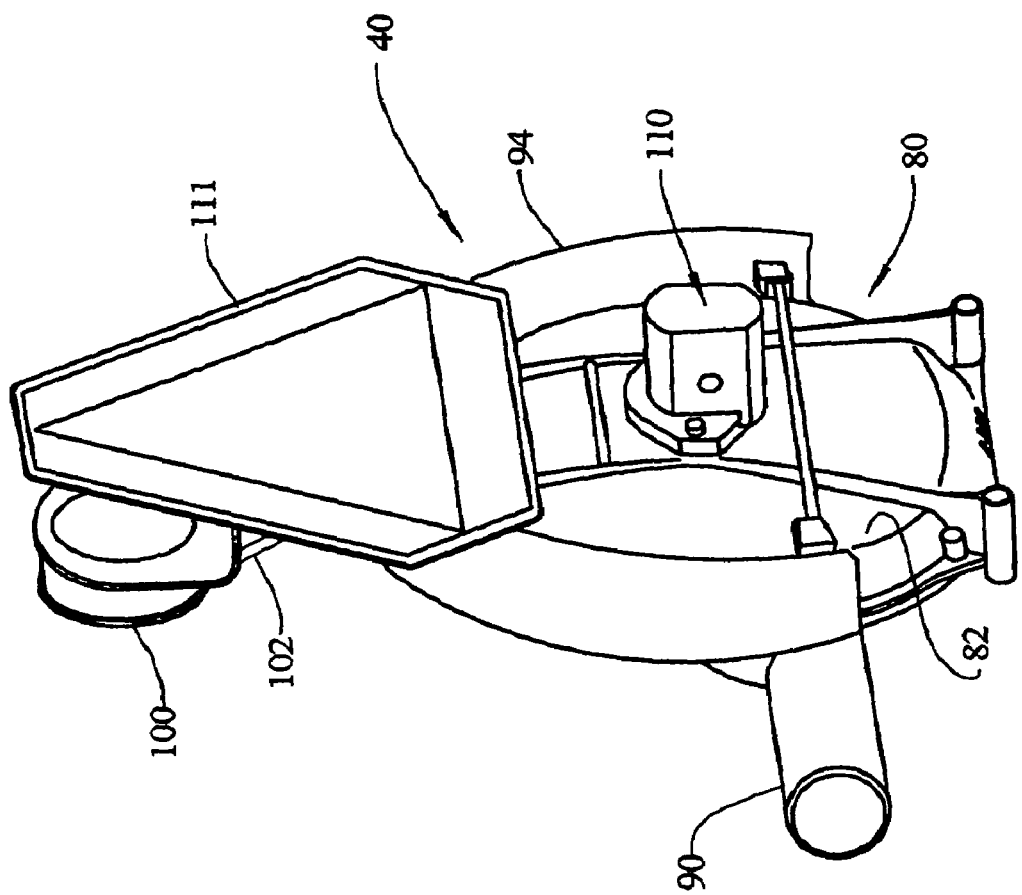
FIG. 4 is a rear perspective view of the vacuum pump of FIG. 3.

FIG. 4 illustrates a hydraulic motor 110 (shown schematically) bolted to the housing 80. The hydraulic motor is typically about five horsepower or less. A "slow-moving vehicle" ("SMV") sign 111 is supported by the bracket 102 fastened to the shield 94 and the housing 80.

FIG. 5 illustrates an exploded view of the vacuum pump 40. Also shown are debris drain slots 129 formed through the housing base 82. The slots 129 allow for the removal of debris which collects between the housing 80 and the impeller assembly 128 described below.

Figure 6:
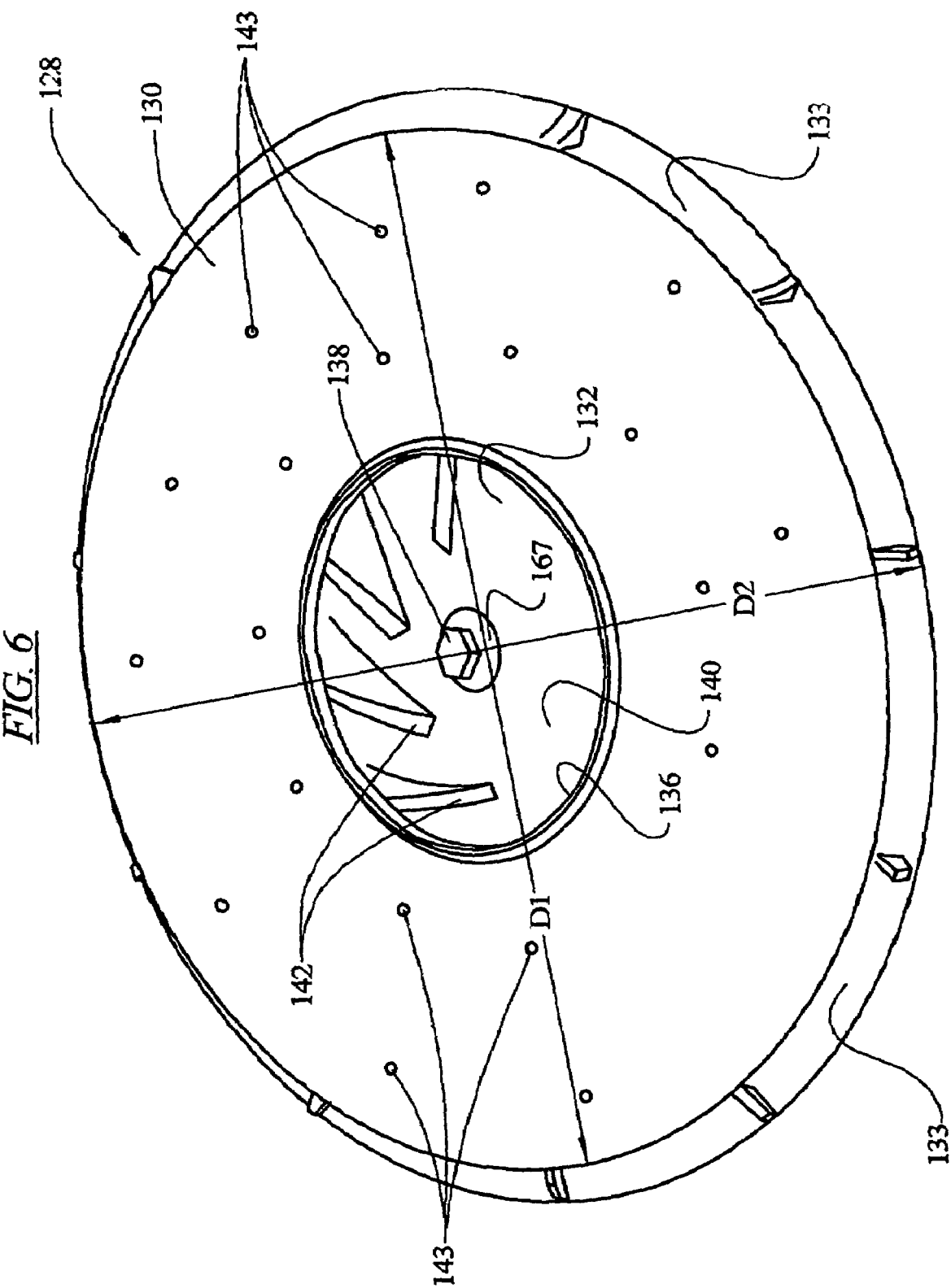
FIG. 6 is a front perspective view of an impeller, removed from the pump of FIG. 3.

FIG. 6 illustrates an impeller assembly 128 that is fit between the housing base 82 and the housing cover 84. An inlet face of the impeller assembly is defined by a shroud 130. The shroud 130 is fastened to an impeller body 132. The shroud 130 has a lesser outside diameter D1 than an outside diameter D2 of the impeller body 132, forming a 360 degree outlet 133 of the pump that is part radially directed and part axially directed as shown in FIG. 9. The shroud 130 includes a circular central opening 136 that serves as the central inlet of the impeller. A center threaded cap 138 is used to cover the attachment of the hydraulic motor 110 to the impeller assembly 128.

Figure 7:
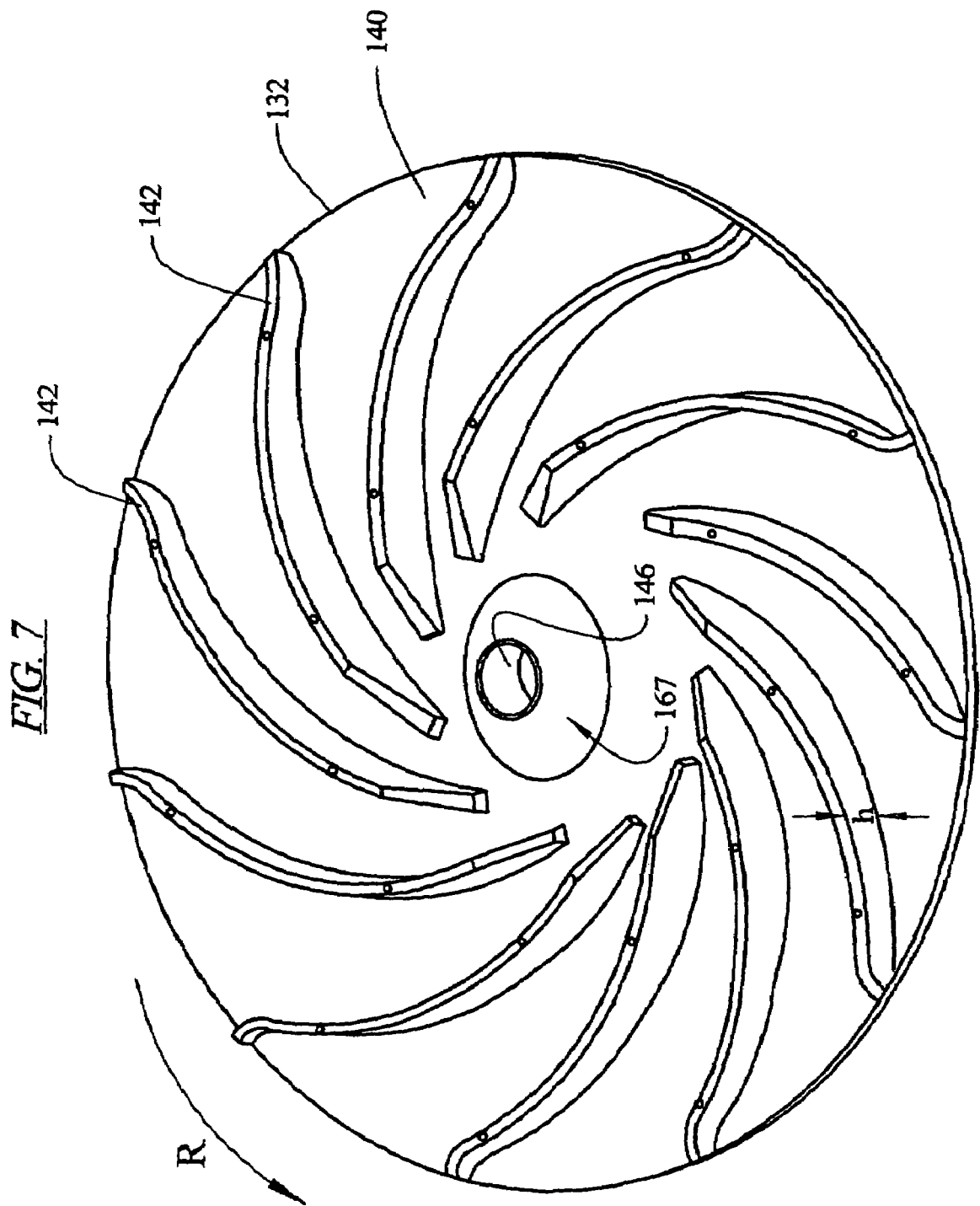
FIG. 7 is a front perspective view of an impeller body removed from the impeller of FIG. 6.

FIG. 7 illustrates the impeller body 132 removed from the assembly 128 shown in FIG. 6. The impeller body 132 includes a base 140 upon which are formed a plurality of curved vanes 142. The design of each impeller fan is such that the vane height "h" from the base 140 is greater at the center of the impeller body 132 and tapers as the vane extends radially. This change in height "h" is designed such that the cylindrical area of the air pumped radially through the impeller remains substantially constant. The shroud 130 is fastened by 22 fasteners 143, two fasteners threaded into each impeller vane 142. Before fastening, a layer of adhesive or sealer is applied between the facing surfaces of the vanes 142 and the shroud 130. The impeller body 132 includes a composite central aperture 146 at a center thereof.

Figure 8:
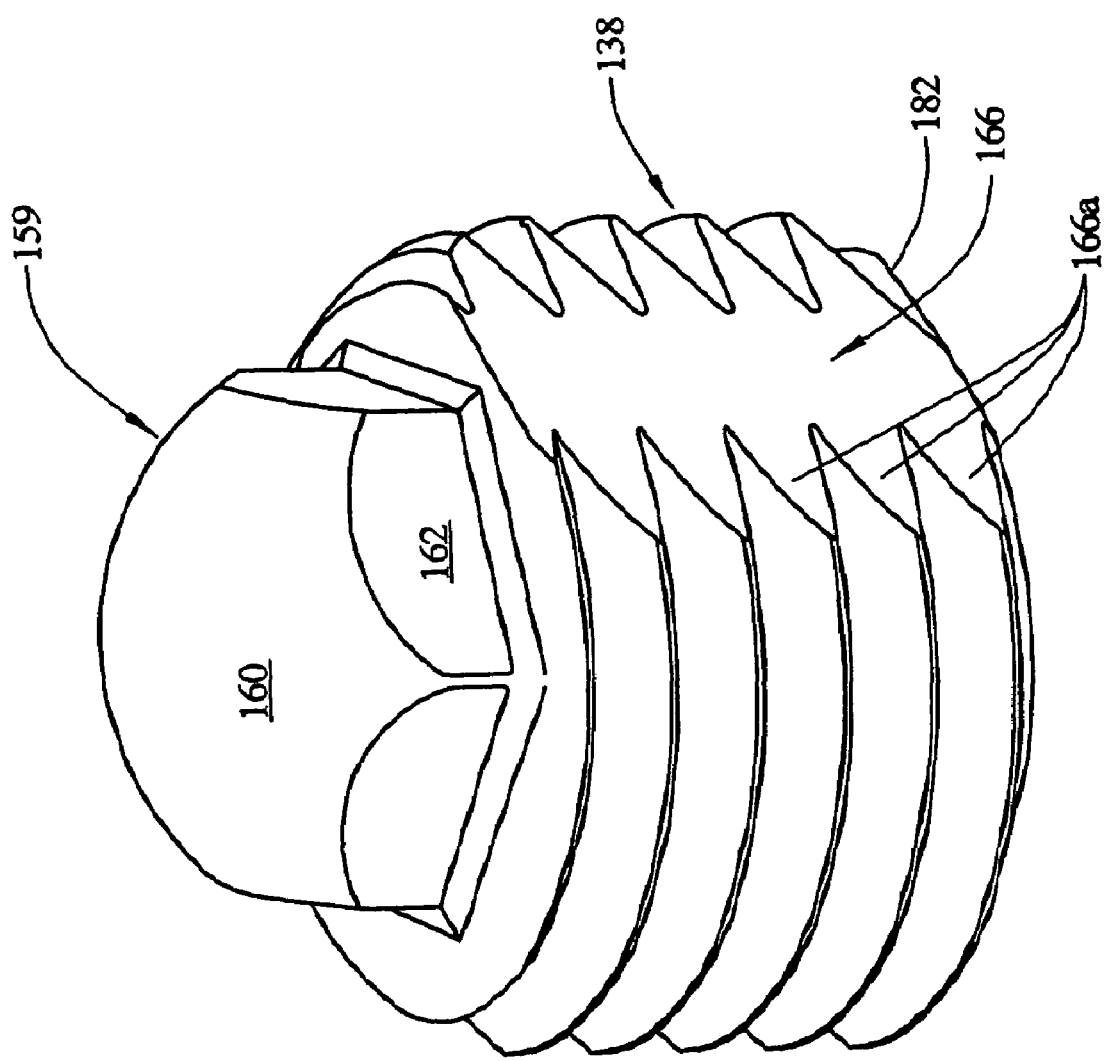
FIG. 8 is a perspective view of a cap taken from the impeller of FIG. 6.

FIG. 8 illustrates the threaded cap 138 in more detail. The cap 138 includes a head portion 159 that is exposed in the central opening 136 of the impeller. The head portion 159 includes a dome region 160 that is formed with a tool-engagable hexagonal region or nut region 162. The head portion 159 is fixed to, or formed with, a threaded shank portion 166. The threaded shank portion 166 has external threads 166a that thread into the threaded region 146a of the aperture 146 in the impeller base 140.

Figure 9A:
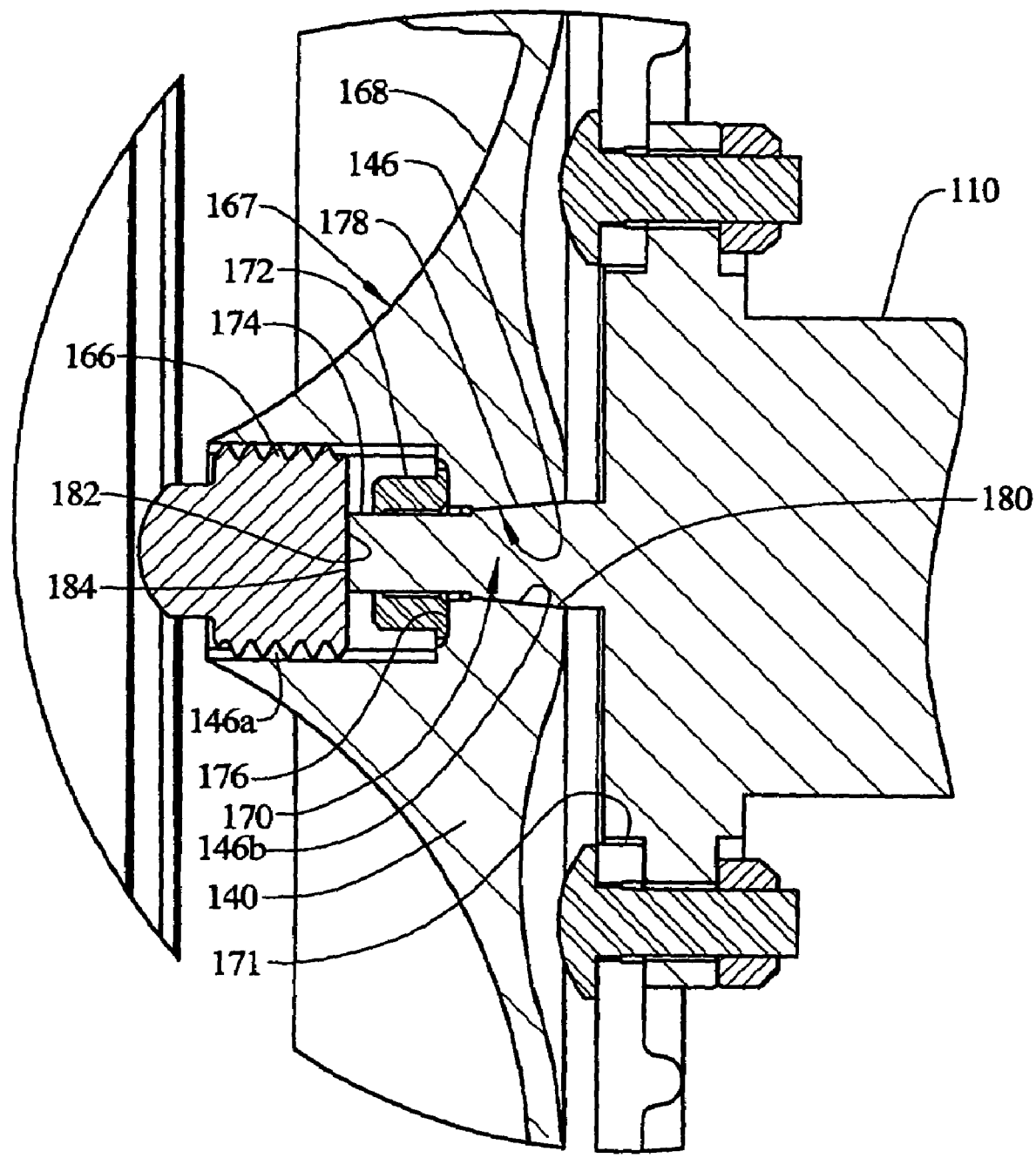
FIG. 9A is an enlarged sectional view taken from FIG. 9.
Figure 9B:
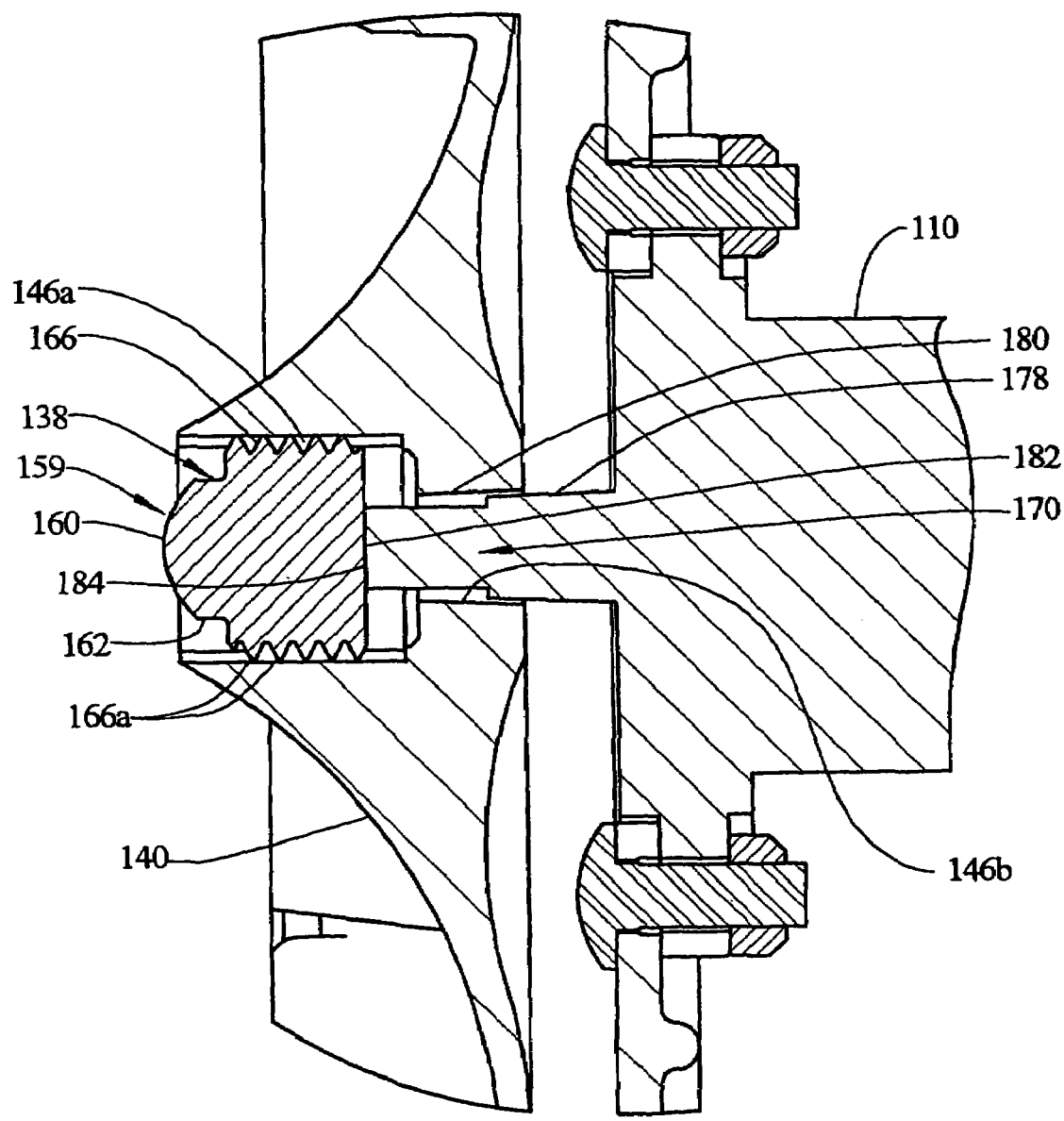
FIG. 9B is an enlarged sectional view similar to FIG. 9A showing the impeller being disassembled from the motor shaft.

FIGS. 9-9B illustrate the vacuum pump 40 in cross-section. The impeller body 132 includes a center hub 167 having a curved, conical surface 168. The motor 110 has an output shaft 170 that penetrates a plain (not threaded) shaft opening 171 of the housing base 82. The shaft 170 is locked axially to the impeller by penetrating a plain region 146b of the aperture 146 and therein being engaged by a nut 172 that is tightened onto a threaded end 174 of the output shaft, the nut bearing against a shoulder 176 of the impeller base 140.

As shown in FIG. 9A, the shaft 170 and the aperture 146 have co-acting tapered regions 178, 180 causing the shaft 170 and the impeller base 140, around the aperture 146, to seize together radially. The shaft 170 can also be axially keyed to the impeller body 132 along the region 146b.

The threaded shank portion 166 of the cap 138 is threaded into the threaded region 146a of the aperture 146 and covers the nut 172. The threaded shank portion 166 is screwed into the threaded region 146a until an end 182 of the shank portion 166 abuts an end 184 of the shaft 170.

To remove the impeller from the motor output shaft 170 for maintenance or replacement, the cap 138 is unscrewed and removed, and the nut 172 is unscrewed and removed. At this point, the impeller body 132 is effectively press fit onto the shaft and manual removal is difficult. According to this aspect the invention, as shown in FIG. 9B, the cap 138 can be screwed back into the aperture 146, until the end 182 of the shank portion 166 abuts the end 184 of the shaft 170. Further tightening of the cap 138 then drives the impeller assembly 128 off the shaft 170 in the axial direction. In other words, the force generated by the center cap being reinstalled into the threaded region 146a of the aperture 146 slides the impeller assembly 128 off the taper 178 on the shaft 170.

As shown in FIGS. 6, 7 and 9, the center hub 167 surrounds the compound aperture 146. The center hub 167 provides for a smooth flow transition from the inlet 136 of the impeller assembly 128 to the passages between the vanes 142.

The impeller center cap 138, particularly the head portion 159 also helps to eliminate a stagnant air spot in the center region of the impeller assembly 128 and begins to impart radial movement to the air, causing a smooth flow transition to the base ends of the vanes.

In operation, the impeller assembly 128 is rotated by the shaft 170, driven by the hydraulic motor 110, within the space defined by the housing 80. The direction of rotation "R" is shown in FIG. 7. Air is drawn into the seed meters 20, through the hoses 42, 43, and through the inlet nozzles 88, 90 and into the impeller assembly 128. The air is pumped by rotation of the impeller assembly radially outward by the vanes 142, through the opening 133 and out through the annular passage 85 formed by the housing cover 84 being spaced from the housing base 82. Dust, small seeds, and debris passing through the passage 85 are directed in a downward direction by the shield 94.

The impeller of the invention allows air to be discharged from the impeller in a 360 degree pattern and avoids channeling the air into a single air stream. This allows the impeller size to be increased without significantly increasing the overall size of the pump. For example, the current JOHN DEERE 1700 series seed planter vacuum pump impeller is 277 mm in diameter whereas the impeller according to the preferred embodiment of the invention is 432.8 mm in diameter. The larger diameter impeller generates a higher pressure drop at 5000 rpm than the current production impeller generates at 8000 rpm with housings of approximately the same size.

The area of the shield 94 has been minimized such that the overall size does not exceed the overall size envelope of the existing design by a more than about 38.7 mm (1.52 in.) in any direction.

The vacuum pump of the invention can generate more vacuum than the current JOHN DEERE 1700 series seed planter vacuum pump and at lower rpm. The pump can be disassembled without any special pull tools. The center cap for the impeller can be used to remove the impeller from the motor shaft.

The center transition of the impeller improves the performance of the assembly by channeling the air stream to the vanes and eliminating the stagnant air in the typical centrifugal fan design. The overall size of the assembly is smaller than known pumps which generate equivalent level of vacuum for seed planter applications.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A vacuum pump, comprising:
   a housing having a housing base and a housing cover defining a volume therebetween and a central inlet through said housing cover;
   an impeller arranged within said housing, said impeller having a central opening in fluid communication with said central inlet;
   wherein said housing base comprises a shaft opening for receiving an output shaft having a threaded end portion for penetrating said shaft opening;
   wherein said impeller comprises a central aperture for receiving said output shaft, said impeller comprising a shoulder within said central aperture, and a cap, said cap having a head portion and a threaded shank portion that is screwed into a threaded region of said central aperture;
   wherein said impeller is securable to said output shaft by a nut tightenable on said threaded end portion, said nut bearing against said shoulder when tightened on said threaded end portion, and wherein said threaded shank portion is threaded into said threaded region of said central aperture to a first threaded depth, and wherein when said nut is removed, said threaded shank portion can be threaded into said threaded region of said central aperture to a second threaded depth, deeper than said first threaded depth, for displacing said output shaft axially with respect to said impeller.

2. The vacuum pump according to claim 1, wherein said shank portion is for bearing against an end of said output shaft when said shank portion is at said first threaded depth.

3. The vacuum pump according to claim 2, wherein said head portion extends into a central region of said impeller.

4. The vacuum pump according to claim 1, wherein said head portion extends into a central region of said impeller.

5. The vacuum pump according to claim 4, wherein said impeller comprises vanes extending out from a periphery of said central region, and said head portion extends into said central region of said impeller substantially between diametrically opposed base ends of two of said vanes.

6. The vacuum pump according to claim 5, wherein said head portion is shaped to smoothly direct air to passages between vanes to reduce stagnant air in said central region of said impeller.

7. The vacuum pump according to claim 5, wherein said vanes are curved.

8. The vacuum pump according to claim 1, wherein said impeller comprises an impeller base and an impeller shroud, spaced apart by a plurality of vanes, said shroud having said central opening, wherein said impeller base includes a curved, substantially conical, central hub in substantial registry with said central opening, said central aperture formed in said central hub.

9. The vacuum pump according to claim 8, wherein said head portion protrudes from said central hub.

10. The vacuum pump according to claim 8, wherein said central hub is located within a central region of said impeller spaced from base ends of said vanes.

11. The vacuum pump according to claim 10, wherein said vanes are curved.

12. The vacuum pump according to claim 11, wherein said vanes include a height between said base and said shroud that is decreasing in a radial direction such that a circumferential flow area through the impeller remains substantially constant along a radial direction.

13. A rotating device for fluid, comprising:
a housing having a housing base and a housing cover defining a volume therebetween and a central inlet through said housing cover;
an impeller arranged within said housing, said impeller having a central opening in fluid communication with said central inlet;
wherein said housing base comprises a shaft opening for receiving an output shaft having a threaded end portion;
wherein said impeller comprises a central aperture for receiving said output shaft, said impeller comprising a shoulder within said central aperture, and a cap, said cap having a head portion and a threaded shank portion that is screwed into a threaded region of said central aperture;
wherein said output shaft comprises a threaded end portion and said impeller is securable to said output shaft by a nut tightened on said threaded end portion, said nut bearing against said shoulder when tightened on said threaded end portion when said threaded shank portion is threaded into said threaded region of said central aperture to a first threaded depth, and wherein when said nut is removed, said threaded shank portion can be threaded into said threaded region of said central aperture to a second threaded depth, deeper than said first threaded depth, to displace said output shaft axially with respect to said impeller.

14. The rotating device according to claim 13, wherein said head portion extends into a central region of said impeller.

15. The rotating device according to claim 14, wherein said impeller comprises vanes extending out from a periphery of said central region, and said head portion extends into said central region of said impeller substantially between diametrically opposed base ends of two of said vanes.

16. The rotating device according to claim 15, wherein said head portion is shaped to smoothly direct fluid to passages between vanes to reduce stagnant fluid in said central region of said impeller.

17. The rotating device according to claim 15, wherein said vanes are curved.

18. The rotating device according to claim 13, wherein said impeller comprises an impeller base and an impeller shroud, spaced apart by a plurality of vanes, said shroud having said central opening, wherein said impeller base includes a curved, substantially conical, central hub in substantial registry with said central opening, said central aperture formed in said central hub.

19. The rotating device according to claim 18, wherein said head portion protrudes from said central hub.

20. The rotating device according to claim 18, wherein said central hub is located within a central region of said impeller spaced from base ends of said vanes; wherein said vanes are curved; and wherein said vanes include a height between said base and said shroud that is decreasing in a radial direction such that a circumferential flow area through the impeller remains substantially constant along a radial direction.

* * * * *

UNITED STATES PATENT AND TRADEMARK OFFICE
CERTIFICATE OF CORRECTION

| | | |
|---|---|---|
| PATENT NO. | : 7,472,662 B2 | Page 1 of 1 |
| APPLICATION NO. | : 11/605188 | |
| DATED | : January 6, 2009 | |
| INVENTOR(S) | : Shane Brueggen | |

It is certified that error appears in the above-identified patent and that said Letters Patent is hereby corrected as shown below:

On the title page item (75), correct the spelling of the inventor's name to Shane Brueggen.

Signed and Sealed this

Fourth Day of August, 2009

JOHN DOLL
*Acting Director of the United States Patent and Trademark Office*